United States Patent

Chang

(10) Patent No.: US 11,451,880 B2
(45) Date of Patent: Sep. 20, 2022

(54) METHOD FOR PERFORMING MARKETING TO TELECOMMUNICATION DEVICE AND ADVERTISEMENT SERVER

(71) Applicant: Groundhog Inc., Taipei (TW)

(72) Inventor: Chaochi Chang, Taipei (TW)

(73) Assignee: Groundhog Inc., Taipei (TW)

( * ) Notice: Subject to any disclaimer, the term of this patent is extended or adjusted under 35 U.S.C. 154(b) by 0 days.

(21) Appl. No.: 17/155,101

(22) Filed: Jan. 22, 2021

(65) Prior Publication Data

US 2022/0239991 A1  Jul. 28, 2022

(51) Int. Cl.
*H04N 21/81* (2011.01)
*H04N 21/258* (2011.01)
*H04N 21/64* (2011.01)
*G06Q 30/02* (2012.01)
*H04N 21/234* (2011.01)
*H04N 21/442* (2011.01)
*H04W 4/23* (2018.01)

(52) U.S. Cl.
CPC ....... *H04N 21/812* (2013.01); *G06Q 30/0261* (2013.01); *H04N 21/23424* (2013.01); *H04N 21/25891* (2013.01); *H04N 21/44213* (2013.01); *H04N 21/44218* (2013.01); *H04N 21/64* (2013.01); *G06Q 30/0275* (2013.01); *H04W 4/23* (2018.02)

(58) Field of Classification Search
CPC ........... H04N 21/812; H04N 21/23424; H04N 21/25891; H04N 21/64; H04N 21/44213; H04N 21/44218; G06Q 30/0261; G06Q 30/0275; H04W 4/23
See application file for complete search history.

(56) References Cited

U.S. PATENT DOCUMENTS

| | | | |
|---|---|---|---|
| 10,701,409 B1 * | 6/2020 | Gupta | H04N 21/44016 |
| 2007/0220545 A1 * | 9/2007 | Awano | H04H 20/28 348/E7.069 |
| 2009/0048908 A1 * | 2/2009 | Kaplan | G06Q 30/0272 705/7.29 |
| 2016/0165320 A1 * | 6/2016 | Shkedi | H04N 21/2668 725/14 |
| 2019/0090030 A1 * | 3/2019 | Bhuyan | H04N 21/41265 |

FOREIGN PATENT DOCUMENTS

| | | |
|---|---|---|
| CN | 105405029 | 3/2016 |
| CN | 108156268 | 6/2018 |
| CN | 110473018 | 11/2019 |
| TW | 201907351 | 2/2019 |

* cited by examiner

*Primary Examiner* — John R Schnurr
(74) *Attorney, Agent, or Firm* — JCIPRNET

(57) ABSTRACT

The disclosure provides a method for performing marketing to a telecommunication device and an advertisement server. The method includes: providing a specific advertisement via a specific advertisement carrier, wherein the specific advertisement carrier is disposed at a specific address; in response to determining a specific telecommunication user of a specific telecommunication device has seen the specific advertisement, obtaining an advertising identifier corresponding to the specific telecommunication device; and performing a marketing operation to the specific telecommunication device based on the advertising identifier corresponding to the specific telecommunication device.

8 Claims, 3 Drawing Sheets

METHOD FOR PERFORMING MARKETING TO TELECOMMUNICATION DEVICE AND ADVERTISEMENT SERVER

BACKGROUND OF THE INVENTION

1. Field of the Invention

The present disclosure generally relates to an advertising mechanism, in particular, to a method for performing marketing to a telecommunication device and an advertisement server.

2. Description of Related Art

Nowadays, watching programs provided by set top boxes has been a common behavior of people. Other than regular programs (e.g., TV shows, movies, etc.), set top boxes also provide various advertisements on their user interfaces.

However, there's no efficient way to find out those telecommunication users who have watched the advertisements on the user interfaces provided by set top boxes, such that the advertisers cannot perform further marketing to those telecommunication users based on the watched advertisements.

SUMMARY OF THE INVENTION

Accordingly, the disclosure is directed to a method for performing marketing to a telecommunication device and an advertisement server, which may be used to solve the above problems.

The disclosure provides a method for performing marketing to a telecommunication device. The method includes: providing a specific advertisement via a specific advertisement carrier, wherein the specific advertisement carrier is disposed at a specific address; in response to determining a specific telecommunication user of a specific telecommunication device has seen the specific advertisement, obtaining an advertising identifier corresponding to the specific telecommunication device; and performing a marketing operation to the specific telecommunication device based on the advertising identifier corresponding to the specific telecommunication device.

The disclosure provides an advertisement server including a storage circuit and a processor. The storage circuit stores a program code. The processor is coupled to the storage circuit, accessing the program code to perform: providing a specific advertisement via a specific advertisement carrier, wherein the specific advertisement carrier is disposed at a specific address; in response to determining a specific telecommunication user of a specific telecommunication device has seen the specific advertisement, obtaining an advertising identifier corresponding to the specific telecommunication device; and performing a marketing operation to the specific telecommunication device based on the advertising identifier corresponding to the specific telecommunication device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
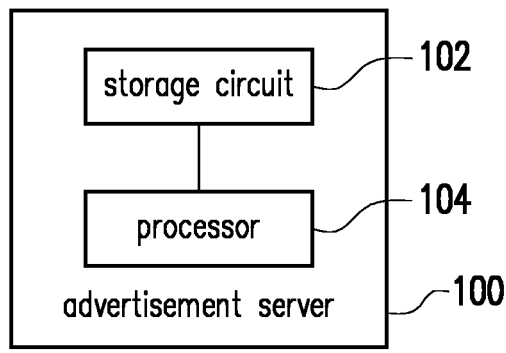
FIG. 1 is a functional diagram illustrating an advertisement server according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which is a functional diagram illustrating an advertisement server according to an embodiment of the disclosure. In various embodiments, the advertisement server 100 may be implemented as an independent server or the like. In some embodiments, the advertisement server 100 may be implemented as a demand side platform (DSP) built in the server of telecommunication service provider, but the disclosure is not limited thereto.

In FIG. 1, the advertisement server 100 includes a storage circuit 102 and a processor 104. The storage circuit 102 is one or a combination of a stationary or mobile random access memory (RAM), read-only memory (ROM), flash memory, hard disk, or any other similar device, and which records a program code and/or a plurality of modules that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the program code stored in the storage circuit 102 to implement the performing marketing to a telecommunication device provided in the disclosure, which would be further discussed in the following.

Figure 2:
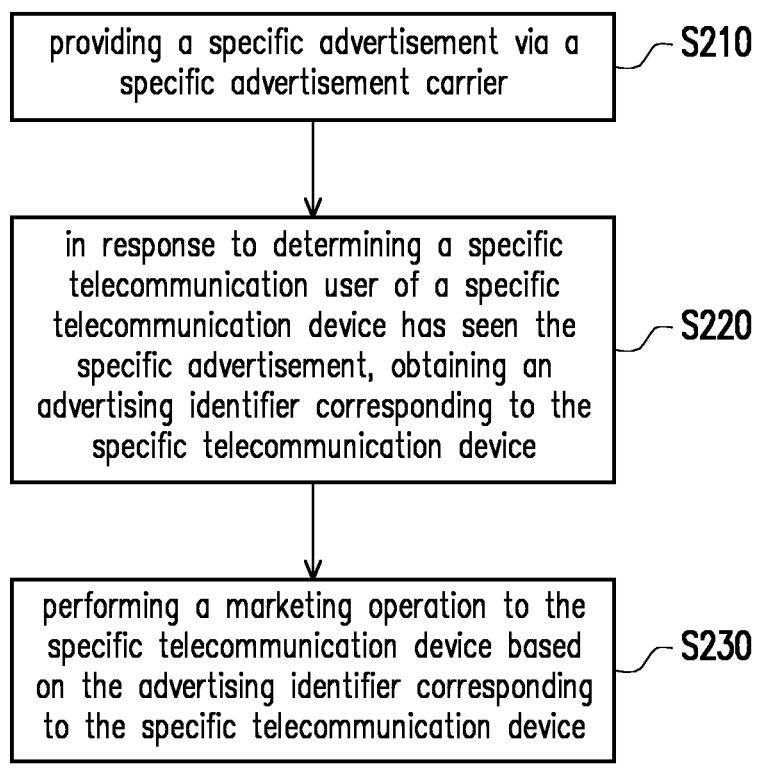
FIG. 2 shows a flow chart of the method for performing marketing to a telecommunication device according to an embodiment of the disclosure.

See FIG. 2, which shows a flow chart of the method for performing marketing to a telecommunication device according to an embodiment of the disclosure. The method of this embodiment may be executed by the advertisement server 100 in FIG. 1, and the details of each step in FIG. 2 will be described below with the components shown in FIG. 1.

In step S210, the processor 104 may provide a specific advertisement via a specific advertisement carrier, wherein the specific advertisement carrier is disposed at a specific address. In step S220, in response to determining a specific telecommunication user of a specific telecommunication device has seen the specific advertisement, the processor 104 may obtain an advertising identifier corresponding to the specific telecommunication device. In step S230, the processor 104 may perform a marketing operation to the specific telecommunication device based on the advertising identifier corresponding to the specific telecommunication device.

In various embodiments, the method of FIG. 2 may be implemented in different ways, which would be discussed in the following first and second embodiments.

In the first embodiment, the specific advertisement carrier may be any objects that can be used to present advertisements, such as digital signages, boards, walls, particular spaces (e.g., a room, a container, or the like), but the disclosure is not limited thereto. Correspondingly, the specific advertisement may be any kind of advertisements that can be presented by the specific advertisement carrier, such as digital advertisements, but the disclosure is not limited thereto.

In the first embodiment, the specific address where the specific advertisement carrier is disposed may be defined as the GPS location and/or the physical address where the specific advertisement carrier locates, but the disclosure is not limited thereto.

In the first embodiment, the processor 104 may determine whether the specific telecommunication device has stayed at the specific address by a predetermined time length (e.g., 3 minutes). In response to determining that the specific telecommunication device has stayed at the specific address by the predetermined time length, the processor 104 may determine that the specific telecommunication user of the specific telecommunication device has seen the specific advertisement, and hence the processor 104 may obtain the advertising identifier corresponding to the specific telecommunication device (step S220).

On the other hand, in response to determining that the specific telecommunication device has not stayed at the specific address by the predetermined time length, the processor 104 may determine that the specific telecommunication user of the specific telecommunication device has not seen the specific advertisement, and hence the processor 104 may neglect the specific telecommunication device, but the disclosure is not limited thereto.

In the first embodiment, the processor 104 may obtain the device location (e.g., GPS coordinates) of the specific telecommunication device from the telecommunication service provider of the specific telecommunication device, and the processor 104 may determine whether the distance between the device location of the specific telecommunication device and the specific address is smaller than a distance threshold (e.g., 10 meters) by the predetermined time length. In response to determining that the distance between the device location of the specific telecommunication device and the specific address is smaller than the distance threshold by the predetermined time length, the processor 104 may determine that the specific telecommunication device has stayed at the specific address by the predetermined time length, and hence the processor 104 may determine that the specific telecommunication user of the specific telecommunication device has seen the specific advertisement.

On the other hand, in response to determining that the distance between the device location of the specific telecommunication device and the specific address is not smaller than the distance threshold by the predetermined time length, the processor 104 may determine that the specific telecommunication device has not stayed at the specific address by the predetermined time length, and hence the processor 104 may determine that the specific telecommunication user of the specific telecommunication device has not seen the specific advertisement, but the disclosure is not limited thereto.

In the embodiments of the disclosure, the processor 104 may use any possible ways to obtain the advertising identifier corresponding to the specific telecommunication device. In the embodiments of the disclosure, the processor 104 may determine an association between the specific telecommunication device and the advertising identifier thereof via a third embodiment (which would be introduced later) of the disclosure. Accordingly, in response to determining that the specific telecommunication user of the specific telecommunication device has seen the specific advertisement, the processor 104 may obtain the advertising identifier corresponding to the specific telecommunication device based on the above association, which would be introduced later as well.

With the advertising identifier corresponding to the specific telecommunication device, the processor 104 may accordingly perform the marketing operation to the specific telecommunication device (step S230). In the first embodiment, the processor 104 may provide one or more advertisement related to the specific advertisement to the specific telecommunication device based on the advertising identifier corresponding to the specific telecommunication device.

In various embodiments, the one or more advertisement related to the specific advertisement may correspond to the same advertiser, the same commercial type, or the same product with the specific advertisement. For example, if the specific advertisement is about a cosmetic product A from an advertiser B (which may be the manufacture of the product A), the one or more advertisement related to the specific advertisement may also be about the cosmetic product A from the advertiser B. Alternatively, the one or more advertisement related to the specific advertisement may be about another product from the advertiser B or another cosmetic product from another advertiser, but the disclosure is not limited thereto.

As could be understood in the above, the method of the disclosure may find out which telecommunication user has seen the specific advertisement and use the corresponding advertising identifier to further provide other advertisements related to the specific advertisement to the telecommunication device of the telecommunication user. Accordingly, accurate advertising may be achieved, and hence the advertising effects may be improved.

In the second embodiment, the specific advertisement carrier may include a media player disposed at the specific address, such as a set top box, an IPTV box, a cable TV modem, or the like. Correspondingly, the specific advertisement may include a media advertisement played by the media player, such as the advertisement shown in the user interfaces (e.g., home page) provided by the set top box, but the disclosure is not limited thereto.

Figure 3:
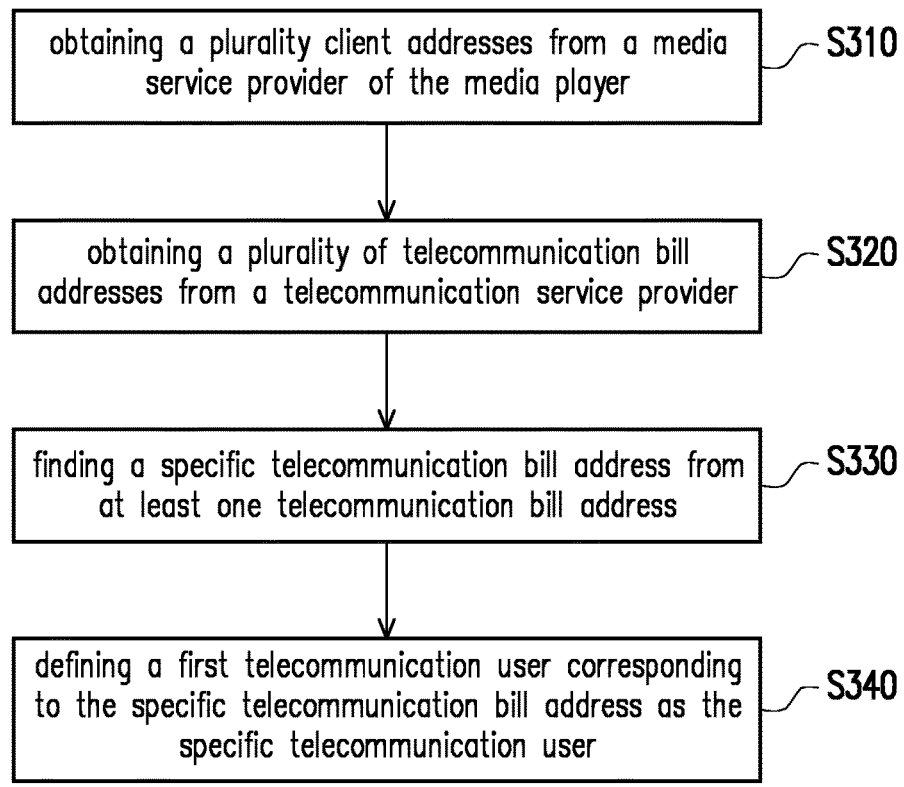
FIG. 3 shows the particular mechanism to find out the specific telecommunication user according to the second embodiment of the disclosure.

In the second embodiment, the processor 104 may perform a particular mechanism shown in FIG. 3 to find out which of the numerous telecommunication users of a telecommunication service provider is more possible to see the specific advertisement played by the specific advertisement carrier disposed at the specific address. Without loss of generality, the telecommunication user which is more possible to see the specific advertisement played by the specific advertisement carrier would be referred to as the specific telecommunication user, but the disclosure is not limited thereto.

See FIG. 3, which shows the particular mechanism to find out the specific telecommunication user according to the second embodiment of the disclosure. In step S310, the processor 104 may obtain a plurality client addresses from a media service provider of the media player (e.g., the manufacture of the set top box and/or the IPTV box), wherein the client addresses correspond to a plurality of clients of the media service provider (e.g., the subscribers of the media service provider). In the second embodiment, the specific address may be one of the client addresses. That is, the specific telecommunication user is assumed to be one of the clients of the media service provider.

In step S320, the processor 104 may obtain a plurality of telecommunication bill addresses from the telecommunication service provider, wherein the telecommunication bill addresses correspond to a plurality of telecommunication users of the telecommunication service provider. In the embodiments of the disclosure, the telecommunication service provider may be used to provide telecommunication service (e.g., 4G/5G telecommunication services, etc.) to the telecommunication users thereof, but the disclosure is not limited thereto.

In step S330, the processor 104 may find a specific telecommunication bill address from the telecommunication bill addresses, wherein the specific telecommunication bill address matches the specific address.

In step S340, the processor 104 may define a first telecommunication user corresponding to the specific telecommunication bill address as the specific telecommunication user.

In brief, the processor 104 may perform cross-reference between the telecommunication bill addresses of the telecommunication service provider and the client addresses of the media service provider to find which of the telecommunication user corresponds to the specific address. Since the first telecommunication user is determined to correspond to the specific telecommunication bill address (which matches the specific address where the specific advertisement carrier is disposed), the processor 104 may determine that the first telecommunication is the specific telecommunication user.

In the second embodiment, during the operation of the processor 104 determining whether the specific telecommunication user of the specific telecommunication device has seen the specific advertisement, the processor 104 may obtain a playing duration of the specific advertisement, wherein the playing duration of the specific advertisement may be understood as the duration when the specific advertisement is displayed by the specific advertisement carrier (e.g., set top box and/or IPTV box), but the disclosure is not limited thereto. In general, the advertisements provided by the media service provider are scheduled to be displayed by the specific advertisement carrier (e.g., set top box and/or IPTV box). That is, the playing time when the specific advertisement will be displayed by the specific advertisement carrier may be obtained before the specific advertisement is displayed. In addition, the advertisement length of the specific advertisement may be obtained before the specific advertisement is displayed as well. Therefore, the processor 104 may estimate the playing duration of the specific advertisement based on the playing time and the advertisement length of the specific advertisement, but the disclosure is not limited thereto.

Next, the processor 104 may obtain a staying duration of the specific telecommunication device at the specific address, wherein the staying duration of the specific telecommunication device at the specific address may be understood as the duration of the specific telecommunication device staying at the specific address, but the disclosure is not limited thereto.

In the second embodiment, the processor 104 may determine whether a distance between the device location (e.g., GPS coordinates) of the specific telecommunication device and the specific address is smaller than the distance threshold. In response to determining that the distance between the device location of the specific telecommunication device and the specific address is smaller than the distance threshold, the processor 104 may accumulate the staying duration.

Next, the processor 104 may determine whether the playing duration overlaps with the staying duration by a predetermined time length (e.g., 30 seconds). In response to determining that the playing duration overlaps with the staying duration by the predetermined time length, it represents that the specific telecommunication device is at the specific address for a while when the specific advertisement is displayed, which means that the specific telecommunication user of the specific telecommunication device is possible to see the specific advertisement. Therefore, the processor 104 may determine that the specific telecommunication user of the specific telecommunication device has seen the specific advertisement. Accordingly, the processor 104 may accordingly obtain the advertising identifier corresponding to the specific telecommunication device (step S220) and perform the marketing operation to the specific telecommunication device based on the advertising identifier corresponding to the specific telecommunication device (S230). The details of steps S220 and S230 may be referred to the first embodiment, which would not be repeated herein.

On the other hand, in response to determining that the playing duration does not overlap with the staying duration by the predetermined time length, it represents that the specific telecommunication user of the specific telecommunication device may be less possible to see the specific advertisement. Therefore, the processor 104 may determine that the specific telecommunication user of the specific telecommunication device has not seen the specific advertisement, but the disclosure is not limited thereto.

As could be understood in the above, in the second embodiment, the method of the disclosure may find out the specific telecommunication user corresponding to the specific address by performing cross-reference between the telecommunication bill addresses of the telecommunication service provider and the client addresses of the media service provider. Next, the method of the second embodiment may determine whether the specific telecommunication user has seen the specific advertisement by comparing the playing duration of the specific advertisement and the staying duration of the specific telecommunication device at the specific address. In response to determining that the specific telecommunication user has seen the specific advertisement, the method of the second embodiment may use the corresponding advertising identifier to further provide other advertisements related to the specific advertisement to the telecommunication device of the telecommunication user. Accordingly, accurate advertising may be achieved, and hence the advertising effects may be improved.

As mentioned in the above, the disclosure also provides a method for obtaining the advertising identifier of the specific telecommunication device, which would be introduced in the following third embodiment.

Figure 4:
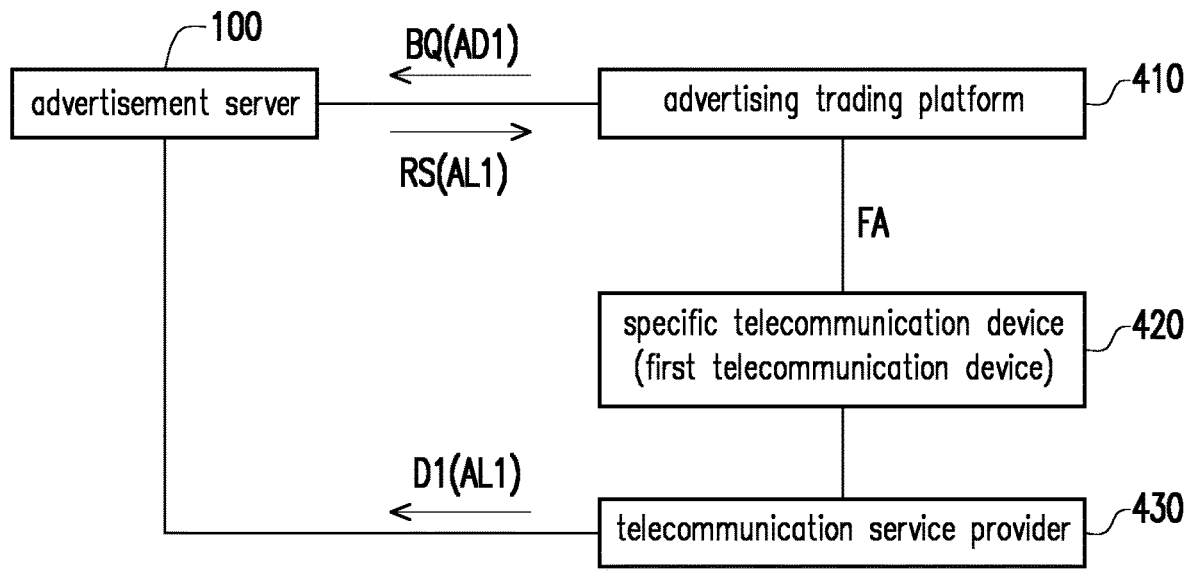
FIG. 4 shows a system for obtaining the advertising identifier according to the third embodiment of the disclosure.

See FIG. 4, which shows a system for obtaining the advertising identifier according to the third embodiment of the disclosure. In FIG. 4, the system may include the advertisement server 100, an advertising trading platform 410, a specific telecommunication device 420, and a telecommunication service provider 430. In the third embodiment, the advertisement server 100, the specific telecommunication device 420, and the telecommunication service provider 430 may correspond to the advertisement server 100, the specific telecommunication device, and the telecommunication service provider discussed in the first and second embodiments. In addition, the advertising trading platform 410 may be a platform where advertisers may bid for performing advertising, such as Ad exchange, but the disclosure is not limited thereto.

Figure 5:
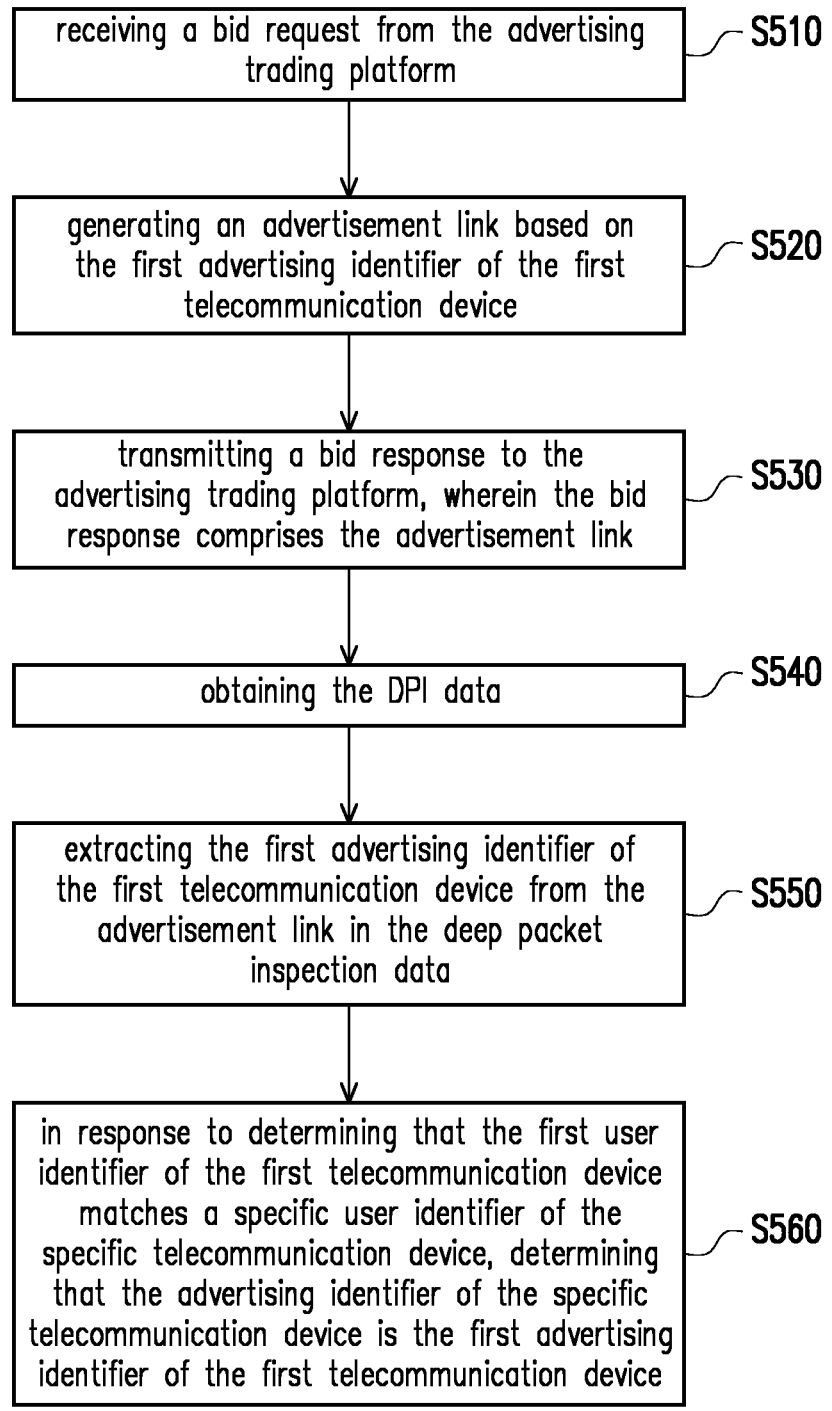
FIG. 5 shows a flow chart of the method for determining the advertising identifier of the specific telecommunication device according to the third embodiment of the disclosure.

See FIG. 5, which shows a flow chart of the method for determining the advertising identifier of the specific telecommunication device according to the third embodiment of the disclosure. The method of this embodiment may be executed by the advertisement server 100 in FIG. 1 and FIG. 4, and the details of each step in FIG. 5 will be described below with the components shown in FIG. 1 and FIG. 4.

Firstly, in step S510, the processor 104 may receive a bid request BQ from the advertising trading platform 410, wherein the bid request BQ may include a first advertising identifier AD1 of a certain telecommunication device. For better understanding, the certain telecommunication device would be assumed to be the first communication device, i.e., the specific telecommunication device 420. However, in the phase where the processor 104 receives the bid request BQ, the processor 104 does not know that the first telecommunication is the specific telecommunication device, which means that the processor 104 does not know the first advertising identifier AD1 is the advertising identifier of the specific telecommunication device 420. Therefore, the processor 104 may perform the following steps to associate the first advertising identifier AD1 with the specific telecommunication device 420, such that the processor 104 may use the first advertising identifier AD1 as the advertising identifier of the specific telecommunication device 420 to perform the above marketing operation.

In the third embodiment, the bid request BQ may be a real time bidding (RTB) request created based on an OpenRTB Specification by the advertising trading platform 410. According to the OpenRTB Specification, the bid request BQ may include an identifier field of a user object, and the identifier field of the user object in the bid request BQ may be referred to as a device identifier of the first telecommunication device. In addition, the bid request BQ may also include other advertisement-related identifiers, such as an identifier for advertisers (IDFA), an android advertising identifier (AAID) of the first telecommunication device, or an identifier for vendor (IDFV), but the disclosure is not limited thereto. Since the device identifier, the IDFA, and the AAID of the first telecommunication device may be used to provide advertisement to the first telecommunication device (i.e., the specific telecommunication device), the device identifier, the IDFA, and the AAID of the first telecommunication device may be generally referred to as the first advertising identifier AD1 in the bid request BQ, but the disclosure is not limited thereto. In other embodiments, the first telecommunication device may be disposed with other device-related identifiers that could be used by the operating system provider for representing the first telecommunication device in the bid request, and these device-related identifiers may be referred to as the first advertising identifier AD1 as well, but the disclosure is not limited thereto.

Next, with the bid request BQ, in step S520, the processor 104 may generate an advertisement link AL1 based on the first advertising identifier AD1 of the first telecommunication device. For example, assuming that the device identifier and the IDFA of the first telecommunication device are characterized by "userid1" and "idfa1", respectively, the advertisement link AL1 generated by the processor 104 may be implemented as "https://userid1_idfa1.ghtinc.com/ userid1_idfa1", "https://userid1.ghtinc.com/userid1_idfa1", "https://idfa1.ghtinc.com/userid1_idfa1", or the like, but the disclosure is not limited thereto.

In step S530, the processor 104 may transmit a bid response RS to the advertising trading platform 410, wherein the bid response RS may include the advertisement link AL1 The details about how the advertisement link AL1 is included in the bid response RS may be referred to the specification of Ad exchange, which would not be provided herein.

After the advertising trading platform 410 receives the bid response RS from the advertisement server 100, the advertising trading platform 410 may determine whether the advertisement server 100 has won the opportunity to provide a first advertisement FA to the first telecommunication device. The determination procedure of the advertising trading platform 410 may be referred to related documents, such as the specification of Ad exchange, but the disclosure is not limited thereto.

In the third embodiment, assuming that the advertising trading platform 410 determines that the advertisement server 100 has won the opportunity to provide the first advertisement FA to the first telecommunication device, the advertising trading platform 410 may generate the first advertisement FA based on the advertisement link AL1 and push the first advertisement to the first telecommunication device. In this case, the first advertisement FA may be shown in some advertisement fields in the user interface of the first telecommunication device for the user to see.

In the third embodiment, if the first advertisement FA is shown or triggered (e.g., clicked by the user (referred to as a first telecommunication user) of the first telecommunication device), the telecommunication service provider 430 would correspondingly generate a deep packet inspection (DPI) data D1.

Afterwards, in step S540, the processor 104 may obtain the DPI data D1 from the telecommunication service provider 430, wherein the DPI data D1 may include the advertisement link AL1 and a first user identifier of the first telecommunication device.

In general, the DPI data stored in the telecommunication service provider is unavailable. However, in the case where the advertisement server 100 is implemented as a demand side platform (DSP) built in the server of telecommunication service provider, the DPI data become available for the advertisement server 100, but the disclosure is not limited thereto.

In various embodiments, the first user identifier of the first telecommunication device may be a telecommunication identifier corresponding to the first telecommunication user of the first telecommunication device. In addition, the telecommunication identifier comprises an International Mobile Subscriber Identity (IMSI) or a Mobile Subscriber ISDN Number (MSISDN), or the like, but the disclosure is not limited thereto.

Assuming that the advertisement link AL1 was implemented as "https://userid1_idfa1.ghtinc.com/ userid1_idfa1", the format of the DPI data D1 may be exemplarily shown in the following Table 1.

TABLE 1

| timestamp | the first user identifier of the first telecommunication device | domain name | URL |
| --- | --- | --- | --- |
| YYYY:MM: DD:mm:SS | (IMSI/MSISDN) | userid1_idfa1.ghtinc.com | /userid 1_idfa1 |

Therefore, in step S550, the processor 104 may extract the first advertising identifier AD1 of the first telecommunication device from the advertisement link AL1 in the DPI data D1. For example, the processor 104 may extract "userid1" and "idfa1" from the advertisement link AL1 in the DPI data D1 as the first advertising identifier AD1 of the first telecommunication device.

For another example, if the first advertising identifier AD1 was implemented as "https://userid1.ghtinc.com/userid1_idfa1" or "https://idfa1.ghtinc.com/userid1_idfa1", the processor 104 may extract "userid1" and "idfa1" from the advertisement link AL1 in the DPI data D1 as the first advertising identifier AD1 of the first telecommunication device.

In the third embodiment, the processor 104 may dedetermine whether the first user identifier of the first telecommunication device matches a specific user identifier of the specific telecommunication device 420, wherein the specific user identifier of the specific telecommunication device 420 may be the IMSI/MSISDN corresponding to the specific telecommunication user of the specific telecommunication device 420.

In the third embodiment, if the first user identifier of the first telecommunication device matches the specific user identifier of the specific telecommunication device 420, it represents that the first telecommunication device is the same as the specific telecommunication device 420. Therefore, in step S550, in response to determining that the first user identifier of the first telecommunication device matches the specific user identifier of the specific telecommunication device 420, the processor 104 may determine that the advertising identifier of the specific telecommunication device 420 is the first advertising identifier AD1 of the first telecommunication device, such that the first advertising identifier AD1 may be associated with the specific telecommunication device 420.

As mentioned in the above, in response to determining that the specific telecommunication user of the specific telecommunication device has seen the specific advertisement, the processor 104 may obtain the advertising identifier corresponding to the specific telecommunication device based on the above association. Specifically, since the processor 104 has determined that the first advertising identifier AD1 is associated with the specific telecommunication device 420, the processor 104 may obtain the first advertising identifier AD1 as the advertising identifier corresponding to the specific telecommunication device 420, but the disclosure is not limited thereto.

On the other hand, in response to determining that the first user identifier of the first telecommunication device does not match the specific user identifier of the specific telecommunication device 420, it represents that the first telecommunication device is not the specific telecommunication device 420. Therefore, the processor 104 may determine that the advertising identifier of the specific telecommunication device 420 is not the first advertising identifier AD1 of the first telecommunication device.

In summary, the method of the disclosure may find out which telecommunication user has seen the specific advertisement and use the corresponding advertising identifier to further provide other advertisements related to the specific advertisement to the telecommunication device of the telecommunication user. Accordingly, accurate advertising may be achieved, and hence the advertising effects may be improved. In addition, the disclosure also provides a novel method for determining the advertising identifier of the specific telecommunication device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for performing marketing to a telecommunication device, comprising:
   providing a specific advertisement via a specific advertisement carrier, wherein the specific advertisement carrier is disposed at a specific address;
   in response to determining a specific telecommunication user of a specific telecommunication device has seen the specific advertisement, obtaining an advertising identifier corresponding to the specific telecommunication device; and
   performing a marketing operation to the specific telecommunication device based on the advertising identifier corresponding to the specific telecommunication device, wherein the specific advertisement carrier comprises a media player disposed at the specific address, the specific advertisement comprises a media advertisement played by the media player, and the method further comprises:
   obtaining a plurality client addresses from a media service provider of the media player, wherein the client addresses correspond to a plurality of clients of the media service provider, and the specific address is one of the client addresses;
   obtaining a plurality of telecommunication bill addresses from a telecommunication service provider, wherein the telecommunication bill addresses correspond to a plurality of telecommunication users of the telecommunication service provider;
   finding a specific telecommunication bill address from the telecommunication bill addresses, wherein the specific telecommunication bill address matches the specific address; and
   defining a first telecommunication user corresponding to the specific telecommunication bill address as the specific telecommunication user.

2. The method according to claim 1, further comprising:
   obtaining a playing duration of the specific advertisement;
   obtaining a staying duration of the specific telecommunication device at the specific address;
   in response to determining that the playing duration overlaps with the staying duration by a predetermined time length, determining that the specific telecommunication user of the specific telecommunication device has seen the specific advertisement.

3. The method according to claim 2, wherein the step of obtaining the staying duration of the specific telecommunication device at the specific address comprises:
   in response to determining that a distance between a device location of the specific telecommunication device and the specific address is smaller than a distance threshold, accumulating the staying duration.

4. The method according to claim 1, wherein the specific advertisement carrier comprises a set top box or an IPTV box.

5. An advertisement server, comprising:
   a non-transitory storage circuit, storing a program code;
   a processor, coupled to the storage circuit, accessing the program code to perform:

providing a specific advertisement via a specific advertisement carrier, wherein the specific advertisement carrier is disposed at a specific address;

in response to determining a specific telecommunication user of a specific telecommunication device has seen the specific advertisement, obtaining an advertising identifier corresponding to the specific telecommunication device; and performing a marketing operation to the specific telecommunication device based on the advertising identifier corresponding to the specific telecommunication device, wherein the specific advertisement carrier comprises a media player disposed at the specific address, the specific advertisement comprises a media advertisement played by the media player, and the processor further performs:

obtaining a plurality client addresses from a media service provider of the media player, wherein the client addresses correspond to a plurality of clients of the media service provider, and the specific address is one of the client addresses;

obtaining a plurality of telecommunication bill addresses from a telecommunication service provider, wherein the telecommunication bill addresses correspond to a plurality of telecommunication users of the telecommunication service provider;

finding a specific telecommunication bill address from the telecommunication bill addresses, wherein the specific telecommunication bill address matches the specific address; and defining a first telecommunication user corresponding to the specific telecommunication bill address as the specific telecommunication user.

6. The advertisement server according to claim 5, wherein the processor further performs:

obtaining a playing duration of the specific advertisement;

obtaining a staying duration of the specific telecommunication device at the specific address;

in response to determining that the playing duration overlaps with the staying duration by a predetermined time length, determining that the specific telecommunication user of the specific telecommunication device has seen the specific advertisement.

7. The advertisement server according to claim 6, wherein the processor performs:

in response to determining that a distance between a device location of the specific telecommunication device and the specific address is smaller than a distance threshold, accumulating the staying duration.

8. The advertisement server according to claim 5, wherein the specific advertisement carrier comprises a set top box or an IPTV box.

* * * * *